United States Patent [19]

Cottle et al.

[11] Patent Number: 4,918,881
[45] Date of Patent: Apr. 24, 1990

[54] OBSERVATION DOME FOR BUILDINGS

[76] Inventors: Douglas J. Cottle, 2303 Central Ave.; Andrew C. Helton, 608 Baltimore St., both of Middletown, Ohio 45044

[21] Appl. No.: 306,774

[22] Filed: Feb. 3, 1989

[51] Int. Cl.$^5$ .............................................. E04B 7/16
[52] U.S. Cl. ....................................................... 52/65
[58] Field of Search ................. 52/65, 72; 49/40, 420, 49/425; 350/567, 568

[56] References Cited

U.S. PATENT DOCUMENTS

| | | |
|---|---|---|
| 106,967 | 8/1870 | Snead . |
| 416,364 | 12/1889 | Hough et al. . |
| 535,990 | 3/1895 | Lowe . |
| 2,361,385 | 10/1944 | Day . |
| 2,448,764 | 9/1948 | Brinson ................................... 49/41 |
| 2,527,740 | 10/1950 | Kurtzon ............................ 49/425 X |
| 2,996,844 | 8/1961 | Paulson . |
| 3,093,869 | 6/1963 | Ranney . |
| 3,112,570 | 12/1963 | De Vasconcellos ........... 350/567 X |

FOREIGN PATENT DOCUMENTS

| | | | |
|---|---|---|---|
| 227337 | 3/1960 | Australia ................................ 49/425 |
| 1136313 | 5/1957 | France .................................. 350/567 |
| 614188 | 7/1918 | U.S.S.R. .................................... 52/65 |
| 11128 | of 1901 | United Kingdom .................. 49/425 |

Primary Examiner—David A. Scherbel
Assistant Examiner—Jerrold D. Johnson
Attorney, Agent, or Firm—Wood, Herron & Evans

[57] ABSTRACT

This invention relates to an observation dome for mounting to the surface of a building, and more particularly it relates to a rotatable transparent dome having an aperture therein for receiving a telescope which is mounted to the roof or side wall of a house or other building structure.

3 Claims, 3 Drawing Sheets

OBSERVATION DOME FOR BUILDINGS

FIELD OF THE INVENTION

This invention relates to an observation dome for mounting to the surface of a building, and more particularly it relates to a rotatable transparent dome having an aperture therein for receiving a telescope which is mounted to the roof or side wall of a house or other building structure.

BACKGROUND OF THE INVENTION

Since time immemorial the stars have held a great fascination for mankind. Throughout history the stars have been used for navigation and countless myths and superstitions have been built around the stars.

In more recent times, scientists, by studying the stars, have been able to learn a great deal about the formation of the universe. In addition, there is an ever present desire to explore the galaxies to determine whether there is life as we know it on other planets. Notwithstanding the scientific benefits of viewing the stars, a great many people enjoy looking at the stars and planets.

SUMMARY OF THE INVENTION

The present invention allows people to view the stars through a telescope from the privacy of their own home. To that end, this invention is directed to a transparent dome that is permanently mountable on the roof or wall of a building structure. The roof or wall of the building structure has a sealed opening cut therein so that the user has access to the telescope in the dome from inside the building. The dome, which may be fixed or rotatable, has an aperture therein for receiving a telescope so that a viewer can be protected from the elements within the confines of his or her home. In a preferred form, the transparent dome is rotatable and includes a tripod-like structure for securing and adjusting the telescope. The invention further comprises means for providing a weatherproof seal about the telescope and the aperture in the dome.

The weatherproof seal preferably comprises a flexible bellows-type weather boot which is engaged at one end to the dome at the periphery of the aperture so that a weatherproof seal is formed. The weather boot projects outwardly from the dome to protect a telescope positioned for use with the dome. The weather boot, which has an expandable diameter to receiver various sized telescopes, may completely or partially envelop the telescope. That is, in one embodiment the boot extends the entire length of and completely surrounds the shaft of the telescope and is provided with a transparent end plate so that the telescope is completely protected. In an alternative embodiment, the weather boot extends outwardly only part of the length of the telescope shaft and forms a weatherproof seal therearound due to its expandable diameter.

The securing and adjusting means preferably is a tripod-like structure which comprises three telescoping legs having suction cups at one end thereof for releasably engaging the inside surface of the dome and universally engaged via a ball joint at their opposite end to a ring which fits about the shaft of a telescope. The ring is sized to receive the shafts of various sized telescopes and has a plurality of thumb screw or other tightening means associated therewith for securing the shaft of the telescope. The tripod-like mechanism, with independently adjustable legs, allows the viewer to aim the telescope in virtually any direction, and thus in combination with the rotation of the dome permits viewing any portion of the sky.

In a preferred embodiment, the dome is rotatably and sealingly coupled to the roof or wall of a building by means of a "floating" ball bearing system. More particularly, the surface to which the dome is to be mounted has a mounting base affixed thereto. The mounting base corresponds to the circular edge of the dome and is fixed to the roof or wall in any known manner to provide a seal. For example, the circular mounting block may have a flashing extending therefrom which is secured underneath the surrounding shingles or roof covering material and sealed with any known sealing material. The mounting block has a channel therein which corresponds to and receives the circular edge of the dome or a projection therefrom. A plurality of ball bearings are disposed in the channel for rotation of the dome.

In a preferred form, the circular edge of the dome has a projection which corresponds to and mates with the channel in the mounting block. The projection has a concave surface which conforms to the ball bearings. In this way, the dome is rotatable while the mounting base is fixed rigidly to the rooftop. Preferably, there are also means associated with the mounting block and dome for locking the dome against rotation once it is in the desired position. These means may include a plurality of latches or a lock-down bracket, screw and spring combination.

In another embodiment, the dome is fixed to the side wall of a house or building for use by persons incapable of climbing stairs or otherwise having access to a rooftop. In this embodiment the dome may be rotatable, as described above, or it may be permanently fixed to the wall of the house using standard construction techniques. This embodiment includes the weather boot and the securing/adjusting means as hereinabove described.

In either embodiment, the dome is also useful for persons involved in neighborhood crime-watch programs in that it allows clandestine observation of the surroundings.

DETAILED DESCRIPTION OF THE INVENTION

Figure 1:
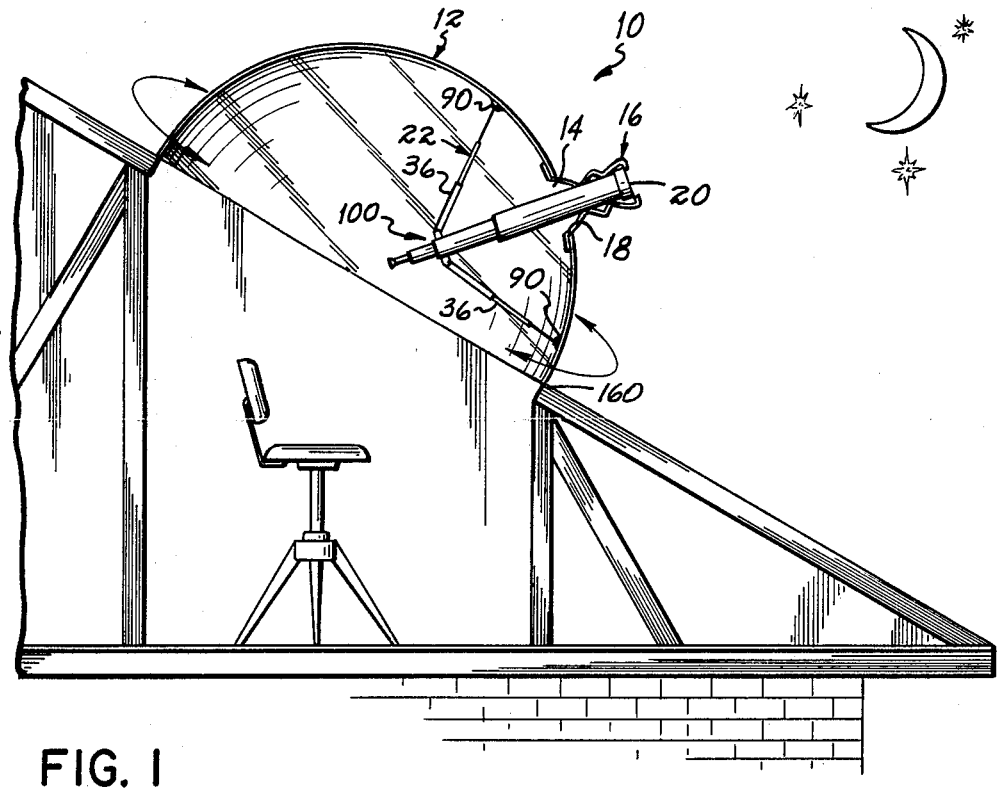
FIG. 1 is a side elevational view, partially broken away, of a building having the observation dome of this invention mounted in the roof of the building.
Figure 5:
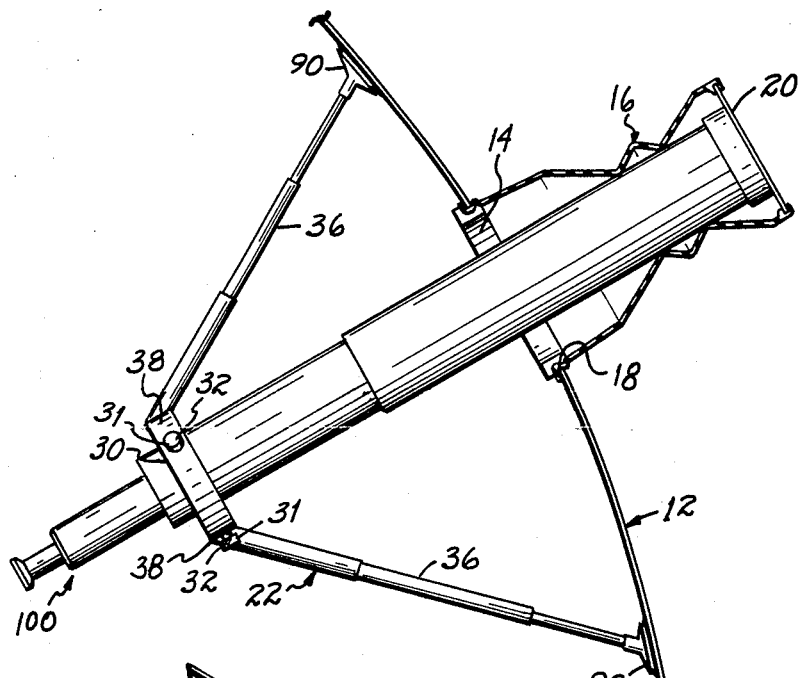
FIG. 5 is a side elevational view of the tripod securing/adjusting apparatus of FIG. 4.

In a preferred form, the observation dome 10 of this invention, shown in FIG. 1, consists of a rotatable transparent dome 12 having an aperture 14 therein for receiving a telescope 100. Dome 12 further includes a weather boot 16 engaged to dome 12 at peripheral edge 18 of aperture 14 to form a weatherproof seal. Weather boot 16, better shown in FIG. 5, is preferably a bellows type seal made from flexible material with an expandable diameter such that telescopes of varying size can be positioned therein. In addition, weather boot 16 has a transparent plate 20 at its outer end for facilitating viewing through the telescope while maintaining protection of the telescope and maintaining a weatherproof structure.

Figure 4:
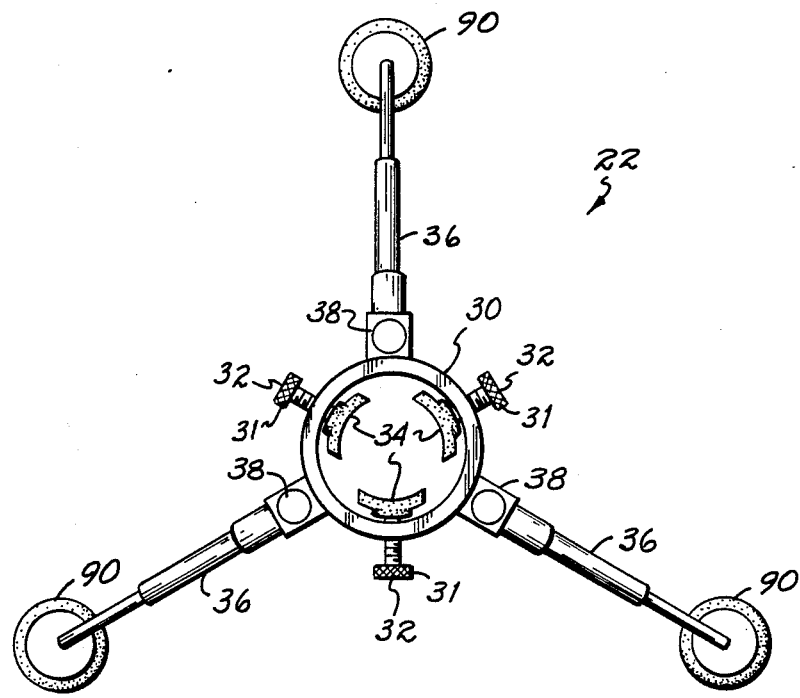
FIG. 4 is a plan view of the tripod securing/adjusting apparatus.

Observation dome 10 further comprises telescope securing/adjusting means 22. FIGS. 4 and 5 illustrate a preferred embodiment of the telescope securing/adjusting means 22 used in conjunction with dome 10. This securing/adjusting means 22 comprises a ring 30 sized to receive the shaft of the telescope, shown in FIG. 5, and having a plurality of clamping screws 32, extending radially through the ring for securing the telescope in place. That is, once a telescope has been positioned in weather boot 16, the shaft of the telescope is inserted in ring 30 and knurled heads 31 of the screws 32 are rotated until pads 34 affixed to the ends of screws 32 engage and clamp the telescope in place. With one end of the telescope positioned through aperture 14 in dome 12 and the other end secured in ring 30, the telescope can be aimed by adjusting legs 36 of the securing/adjusting means 22. Legs 36 are attached to ring 30 at one end by a universal-type joint 38 and are extensible in nature (for example, telescopic). Legs 36 may have pads or suction cups 90 at their opposite end for engaging the inside surface of dome 12. In this way, legs 36 can be extended or retracted, individually or in any desired combination, to aim the telescope through the aperture in virtually any direction.

Figure 2:
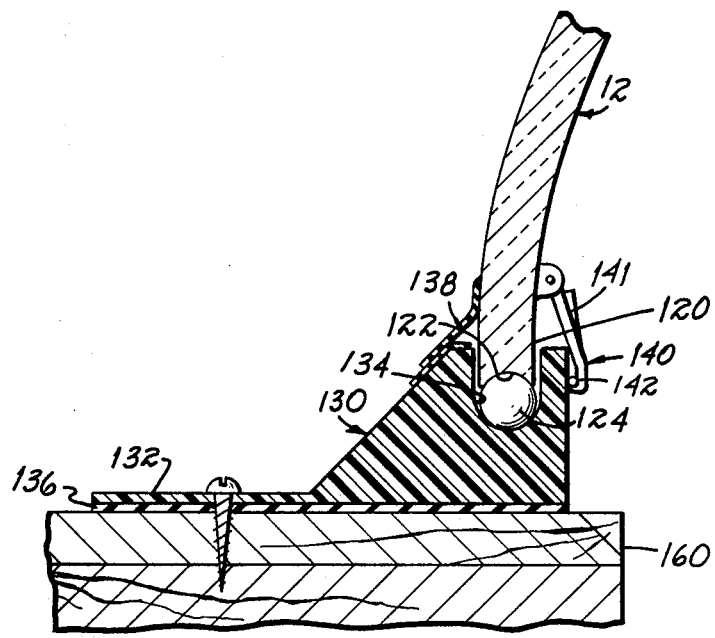
FIG. 2 is a cross-section of one embodiment of the circular dome edge and mounting base.
Figure 3:
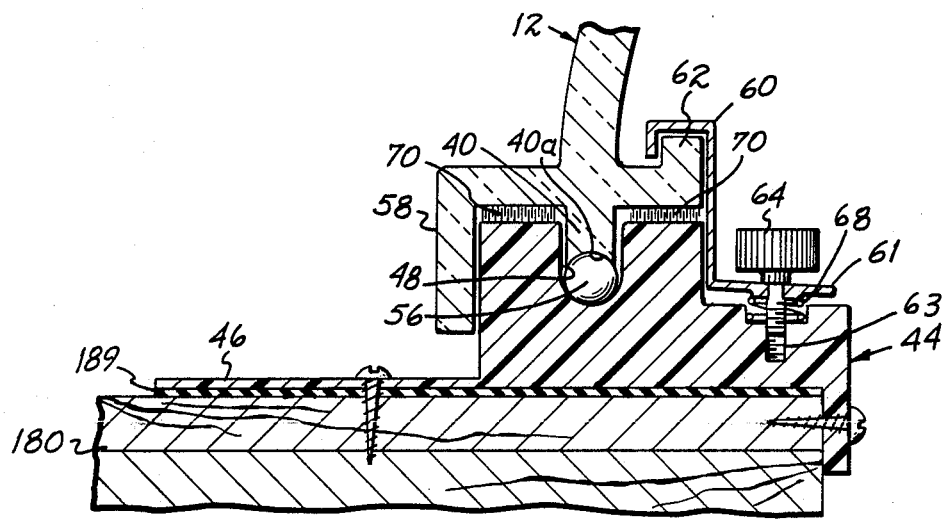
FIG. 3 is an alternative embodiment, in cross-section, of the circular dome edge and mounting base.

FIGS. 2 and 3 illustrate two different alternative embodiments of the dome support means which permit the dome to be sealingly mounted in a wall, such as a roof, of a building and permit the dome to be rotated in order to allow the viewer to observe virtually any portion of the sky. In FIG. 2, a circular edge 120 of dome 12 is formed with a concave face 122 for floating or riding on a plurality of ball bearings 124. Ball bearings 124 are disposed for movement in channel 134 of mounting block 130. Mounting block 130 is in turn rigidly and sealingly fixed to a roof or wall surface 160 of a building structure by any known construction technique. For example, mounting block 130 may have a flashing 132 which is nailed or screwed to roof surface 160 and which may be sealed thereto with any suitable sealant material 136. Thus, dome 12 can freely rotate while mounting block 130 is rigidly fixed in place. Dome 12 has associated therewith a weather seal 138 in the form of a skirt affixed to the exterior surface of the dome and extending over the outer edge of the mounting block 130 to keep out moisture and hot or cold air. Finally, FIG. 2 shows a latching mechanism 140, of which there may be multiple sets, associated with dome 12 and mounting block 130 for locking dome 12 against rotation when it has been positioned in a desired position. In its illustrated embodiment, the latching mechanism 140 comprises a series of hooks 141 pivotally suspended from the inside surface of the dome and engageable with a locking element 143 of the mounting block 130.

FIG. 3 illustrates a second embodiment of the dome support means wherein the circular edge of dome 12 is provided with a plurality of flanges 40, 58 and 62. One flange 40, projects downwardly from the circular edge of dome 12 and has a concave surface 40a for floating or riding on a plurality of ball bearings 56 disposed in a channel 48 of the mounting block 44. This mounting block 44 is rigidly and sealingly fixed to a roof or wall surface in any suitable manner known to those skilled in the art. For example, the mounting block 44 may include a flashing 46 nailed, screwed or otherwise fixed to the desired building surface 180 with a seal 189 such as tar or silicone rubber, sandwiched between the building wall 180 and the underside of the mounting block and flashing.

The channel 48 in mounting block 44 receives flange 40 of dome 12 such that the dome 12 is freely rotatable on its mounting block. Dome 12 also has a flange 58 which extends radially outwardly and downwardly from the bottom edge of the dome 12 and covers an outer edge of the block 44 to provide a seal against the weather. The bottom edge of the dome 12 also has the flange 62 extending radially inwardly and upwardly from the bottom of the dome. This inwardly extending flange is engageable by a locking bracket 60 for securing the dome against rotation when it is in the desired position. For additional weatherproofing, weatherstripping material 70 may be disposed between mounting block 44 and flanges 58 and 62.

Locking bracket 60 has an upper hook shaped end engageable with the inner flange 62 of the dome. It also has a lower horizontal edge 61 through which a locking screw 64 extends. The lower end of this locking screw is threaded into a threaded bore 63 of the mounting block 44. Ideally, there may be a plurality of locking brackets 60 positioned about the perimeter of the observation dome so that it is held in place by uniform pressure. Compression springs 68 are located over each screw between the top of the mounting block 44 and the bottom of the edge 61 so as to bias each mounting bracket 60 out of engagement with the flange 62 of the dome when the screw 64 is loosened. Thereby, the dome 12 is freely rotatable by a user when locking screws 64 are loosened. When dome 12 is in the desired position, locking screws 64 are tightened and locking brackets 60 lock dome 12 against rotation.

Figure 6:
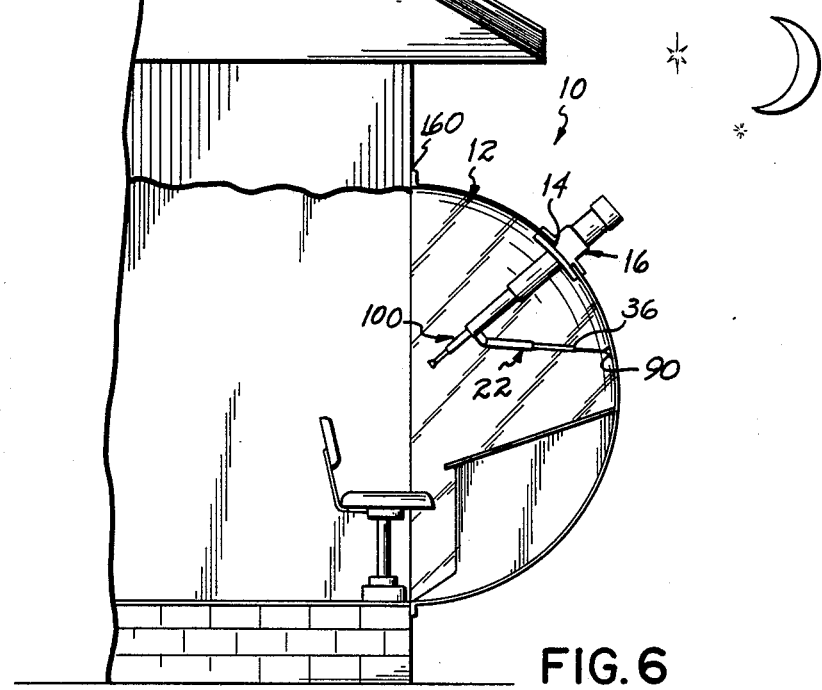
FIG. 6 is a side elevational view, partially broken away, of a building having the observation dome of this invention mounted in a side wall of the building.

FIG. 6 shows an alternative embodiment of observation dome 10 in which the dome 12 is mounted to the side wall of a building structure to allow persons without access to a roof, the ability to view the stars. This embodiment preferably has all the features of the rooftop dome hereinabove described except that it is mounted in a sidewall of a building rather than a roof wall. In all embodiments described herein, dome 12 may have a material layer thereon, not shown, which allows the user to view out, but doesn't permit viewing into the dome. This material may also be reflective to reduce the solar heating of the building during hot weather.

Other and further variations or modifications are contemplated by this invention and will be appreciated by those skilled in the art. Therefore, I do not intend for my invention to be limited except by the scope of the following appended claims.

What is claimed is:

1. An observation dome for mounting to a building to form a permanent part of an exterior wall thereof, said dome comprising:
   a semi-spherical transparent dome having a circular edge adapted to be sealingly mounted to a surface of a building, said dome having an aperture therethrough for receiving a telescope;
   means mounted within said come for supporting and adjustably aiming a telescope positioned for use with said dome, said means comprising a ring sized to receive an end of a telescope, a plurality of screws operably associated with said ring for securing said end of a telescope in said ring, and a plurality of legs associated with said ring for adjustably aiming a telescope secured by said ring, said legs being telescopically adjustable and each said leg being universally adjustably attached at a first end to said ring and attached at a second end to the inside surface of said dome, and sealing means mounted on said come for providing a weather-proof closure of said aperture.

2. An observation dome for mounting to a building to form a permanent part of an exterior wall thereof, said dome comprising:

a semi-spherical transparent dome having a circular edge adapted to be sealingly mounted to a surface of a building, said dome having an aperture therethrough for receiving a telescope;

means mounted within said dome for supporting and adjustably aiming a telescope positioned for use with said dome; and sealing means mounted on said dome for providing a weather-proof closure of said aperture, said sealing means comprising a flexible bellows-type boot sealingly engaged at a first end to said dome about the periphery of the aperture, said boot projecting outward from said dome to surround a telescope positioned through said aperture and having a transparent plate at a second end to protect the telescope while simultaneously permitting viewing therethrough.

3. An observation dome for mounting to a building to form a permanent part of an exterior wall thereof, said dome comprising:

a semi-spherical transparent dome having a circular edge adapted to be sealingly mounted to a surface of a building, said dome having an aperture therethrough for receiving a telescope;

means mounted within said dome for supporting and adjustably aiming a telescope positioned for use with said dome; and sealing means mounted on said dome for providing a weather-proof closure of said aperture, said sealing means comprising a flexible bellows-type boot sealingly engaged at a first end to said dome about the periphery of the aperture, said boot having a second end with an expandable diameter for sealingly engaging the shaft of a telescope positioned therein.

* * * * *